(12) United States Patent
Wang et al.

(10) Patent No.: US 9,793,713 B2
(45) Date of Patent: Oct. 17, 2017

(54) METHOD FOR IMPROVING SMALL DISTURBANCE STABILITY AFTER DOUBLE-FED UNIT GETS ACCESS TO THE SYSTEM

(71) Applicant: GANSU ELECTRIC POWER CORPORATION WIND POWER TECHNOLOGY CENTER, Lanzhou, Gansu Province (CN)

(72) Inventors: Ningbo Wang, Lanzhou (CN); Chongru Liu, Lanzhou (CN); Long Zhao, Lanzhou (CN); Yi Ding, Lanzhou (CN); Zhongyi Liu, Lanzhou (CN); Yanhong Ma, Lanzhou (CN); Dan Wang, Lanzhou (CN); Dan Jin, Lanzhou (CN); Wenying Liu, Lanzhou (CN); Shiyuan Zhou, Lanzhou (CN); Kun Ding, Lanzhou (CN); Qiang Zhou, Lanzhou (CN); Jin Li, Lanzhou (CN)

(73) Assignee: GANSU ELECTRIC POWER CORPORATION WIND POWER TECHNOLOGY CENTER, Lanzhou (CN)

( * ) Notice: Subject to any disclaimer, the term of this patent is extended or adjusted under 35 U.S.C. 154(b) by 177 days.

(21) Appl. No.: 14/649,532

(22) PCT Filed: Mar. 28, 2014

(86) PCT No.: PCT/CN2014/000347
§ 371 (c)(1),
(2) Date: Jun. 3, 2015

(87) PCT Pub. No.: WO2014/154027
PCT Pub. Date: Oct. 2, 2014

(65) Prior Publication Data
US 2015/0318697 A1 Nov. 5, 2015

(30) Foreign Application Priority Data

Mar. 29, 2013 (CN) .......................... 2013 1 0109236

(51) Int. Cl.
*G06F 19/00* (2011.01)
*H02J 3/00* (2006.01)
(Continued)

(52) U.S. Cl.
CPC ................ *H02J 3/00* (2013.01); *G05B 13/04* (2013.01); *G06F 17/16* (2013.01)

(58) Field of Classification Search
CPC ............. H02J 3/00; G06F 17/16; G05B 13/04
See application file for complete search history.

(56) References Cited

U.S. PATENT DOCUMENTS 8,239,070 B1 * 8/2012 Schlueter .................. H02J 3/00
700/286
8,963,374 B2 * 2/2015 Wang ...................... H02J 3/386
290/44

(Continued)

FOREIGN PATENT DOCUMENTS

| CN | 101630273 A | 1/2010 |
| CN | 102879698 A | 1/2013 |

(Continued)

OTHER PUBLICATIONS

Jazaeri, M., et al. "Eigenvalue Analysis of a Network Connected to a Wind Turbine Implemented with a Doubly-Fed Induction Generator (DFIG)." Journal of applied research and technology 10.5 (2012): 791-811.*

(Continued)

*Primary Examiner* — Michael D Masinick
(74) *Attorney, Agent, or Firm* — Jiwen Chen

(57) ABSTRACT

A method for improving system small disturbance stability after double-fed unit gets access to the system belongs to the (Continued)

field of electric power system operation and control technology. A sensitivity analysis is adopted to optimize parameter, through making sensitivity analysis on the non-ideal dominant mode happens to the system to find out several nonzero elements that are most sensitive to this mode in system matrix; elements of state matrix is adopted to replace the elements of system matrix to make analysis so as to find out the most relevant parameter set; setting parameters change in the interval to observe track for the change of eigenvalues of corresponding mode and then balancing and optimizing system parameters comprehensively according to the change of eigenvalues. Without adding other control means, the present invention can improve dominant modal damping caused by selecting improper controller parameters or system parameters after double-fed unit gets access to the system without increasing cost; as this method is also highly targeted, exhaustive efforts for all the adjustable parameters of the system can be avoided, which not only greatly decreases workload, but also improves computational efficiency, so that it is very instructive.

7 Claims, 3 Drawing Sheets

(51) Int. Cl.
    *G06F 17/16*     (2006.01)
    *G05B 13/04*     (2006.01)

(56) References Cited

U.S. PATENT DOCUMENTS

| | | | | |
|---|---|---|---|---|
| 2009/0143871 A1* | 6/2009 | Gao | ...................... | G05B 13/04 700/29 |
| 2011/0295510 A1* | 12/2011 | Gulati | ...................... | G01V 1/28 702/16 |
| 2015/0039228 A1* | 2/2015 | Wang | ...................... | G01W 1/00 702/3 |
| 2015/0302332 A1* | 10/2015 | Wang | ...................... | G06Q 50/06 705/7.22 |
| 2015/0349528 A1* | 12/2015 | Wang | ...................... | H02J 3/386 307/52 |
| 2015/0357818 A1* | 12/2015 | Wang | ...................... | H02J 3/38 307/52 |
| 2016/0092622 A1* | 3/2016 | Wang | .................. | G06F 17/5009 703/2 |
| 2016/0161538 A1* | 6/2016 | Wang | .................. | G06F 17/5009 324/113 |
| 2016/0169202 A1* | 6/2016 | Wang | ...................... | H02J 3/386 290/44 |

FOREIGN PATENT DOCUMENTS

| | | |
|---|---|---|
| CN | 103197559 A | 7/2013 |
| CN | 103472731 A | 12/2013 |
| WO | WO9510874 A1 | 4/1995 |

OTHER PUBLICATIONS

Gautam, Durga, Vijay Vittal, and Terry Harbour. "Impact of increased penetration of DFIG-based wind turbine generators on transient and small signal stability of power systems." IEEE Transactions on Power Systems 24.3 (2009): 1426-1434.*

Zheng, Jinghong et al., Small-signal Stability Analysis of a Microgrid Switching to Islanded Mode, Automation of Electric Power Systems, No. 15, pp. 25-30, Aug. 10, 2012.

Chen, Zhong, Real-time stability control of power system with small disturbance, Electric Power Automation Equipment, vol. 32, No. 3, pp. 42-46, Mar. 31, 2012.

Li, Yuanyuan et al., Impact of Grid-Connected Wind Turbine Generators on Small Signal Stability of Power Gird, Power System Technology, vol. 36, No. 8, pp. 50-54, Aug. 31, 2012.

* cited by examiner

METHOD FOR IMPROVING SMALL DISTURBANCE STABILITY AFTER DOUBLE-FED UNIT GETS ACCESS TO THE SYSTEM

This is a U.S. national stage application of PCT Application No. PCT/CN2014/000347 under 35 U.S.C. 371, filed Mar. 28, 2014 in Chinese, claiming priority benefit of Chinese Application No. 201310109236.4, filed Mar. 29, 2013, which is hereby incorporated by reference.

TECHNICAL FIELD

The present invention relates to a method for improving small disturbance stability after double-fed unit gets access to a system, especially a method with sensitivity analysis to improve disturbance stability after double-fed unit gets access to a system, which belongs to the field of operation and control technology of an electric power system.

BACKGROUND TECHNOLOGY

With reserves of fossil fuel decrease, environmental pollution and energy shortage have been predominant and highly concerned. In order to solve the above problem, China is now striving to develop new energies such as wind power, and wind power generation has stepped into steady development after rapid growth for many years. Although the problem of wind power grid connection has been eased to a certain extent in recent years, after wind power gets access into the system, it will still cause a series of problems, which limits the further development of the wind power. Among the problems, small disturbance stability problem generated after grid connection of wind power is especially acute. At present, the mainstream model of wind turbines in China is double-fed induction generator. After getting access to the system, the generators will lead to weak damping mode, reduce system small disturbance stability margin and increase the risks for the system to operate normally. Therefore, it is very urgent to research how to improve small disturbance stability after double-fed unit gets access to the system.

Traditional methods for improving small disturbance stability after wind turbines get access to the system mainly include adopting some algorithm to optimize overall parameters or adding PSS device. The former method is of a large workload with modest effect and it cannot effectively control certain several dominant modes; the latter one is of obvious effect, but the parameter adjustment is complex and the investment cost will also rise. For the method of using sensitivity analysis to optimize system parameters mentioned in the present invention, sensitivity analysis can be made on the weak damping mode and relevant parameters can be comprehensively selected through analyzing change of eigenvalues according to analysis results of system characteristic matrixes. In this way, for a series of unstable modes or weak damping modes generated for selecting parameters unreasonably, relevant modal damping can be improved without adding other devices. Besides, this method also can greatly decrease the workload generated by unnecessary try, so that it is instructive for how to set system parameters.

SUMMARY OF THE INVENTION

The present invention, first, obtains the system matrix A' by using eigenvalue analysis after double-fed unit gets access to the system, then through eigenvalue analysis finds out the dominant mode that requires special attention (the dominant mode includes unstable modes or weak damping modes), determines sensitivity of the elements in matrix A' of the above modes and selects one to two nonzero elements with the highest sensitivity; then sequentially changes the changeable parameters of the elements with the best sensitivity (the specific elements need to be determined according to the sensitivity analysis results) within a certain interval (the interval is related to the elements that need to be changed; if the elements are electric parameters, the interval is the parameter value range of the actual electric components; if the elements are control parameters, the interval is the upper and lower limits of the specific controller parameters; if no upper and lower limits are provided for the parameters, the interval can be chosen freely under the condition that the lower limit is not negative) and observes the trend for eigenvalues of the dominant mode to determine optimal value of all parameters.

Technical solution of the present invention refers to a method for improving small disturbance stability after double-fed unit gets access to the system through adopting sensitivity analysis to optimize controller and system parameters, comprising the following steps:

Step 1: building complete mathematical models for double-fed unit, which mainly include aerodynamic model, generator model, mechanical model and control system model, listing a system state equation and an output equation and then building small disturbance mathematical model $\Delta\dot{x}=A'\Delta x$ by integrating system power flow equation after double-fed unit gets access to the system. The system power flow equation is current technology, where the specific format relates to the selection of the system output variable and the object is to constitute simultaneous equations with the output equation in order to offset the output variable and set up the relationship between the state variable and the input variable.

Step 2: calculating a left modal matrix $\psi$ and a right modal matrix $\phi$ of a matrix A', determining the sensitivity of unstable modes or weak damping modes to the matrix A' with the formula $$\frac{\partial \lambda_i}{\partial a_{kj}} = \psi_{ik}\phi_{ji}$$

and finding out one to two nonzero elements $a'_{ij}$ with the highest sensitivity in the matrix; analysis indicates that at the low and middle frequency band concerned by small disturbance stability of the system, the difference between eigenvalue of the matrix A' and that of a state matrix A is not very large and as expression of A' is very complex, element $a_{ij}$ in A is used to make sensitivity analysis instead of the element $a'_{ij}$ in A'. The formula is the sensitivity calculation formula where $\partial$ is a partial derivative, $\lambda i$ is the i-th mode, $a'_{kj}$, $\psi_{kj}$, $\phi_{kj}$ are elements at the k-th row and j-th column of the system matrix, the left mode matrix and right mode matrix, respectively.

Step 3: for controller or system parameters that can be set in $a_{ij}$, changing value of these parameters within a certain interval, observing steady-state value of the variable required while calculating eigenvalue of matrix A' in simulation results, then putting the steady-state value in A' to solve the eigenvalues that correspond to each group of parameters and drawing a chart on the change track of eigenvalues. If eigenvalues are disperse, a part of the overlapped eigenvalues need to be locally enlarged to observe the trend for eigenvalues of dominant modes of the system.

Step 4: if there are other parameters that can be set in $a_{ij}$, then repeating Step 3.

Step 5: comprehensively analyzing the chart on modal eigenvalues change with the track of parameters in Step 4, adjusting the parameters in Step 4, then selecting appropriate parameter combination upon comparison, with which both dominant modal damping and small disturbance stability of the system can be obviously improved.

The system matrix A' illustrated in the Step 1 is built in the following methods:

Selecting appropriate state variable, input variable and output variable; the state equation, output equation and power flow equation of the system can be expressed in the following general forms:

$$\dot{x} = f(x,u)$$

$$y = g(x,u)$$

$$y = h(x,u) \quad (1)$$

Linearizing Equation (1) at steady-state operating point, it can be concluded as:

$$\Delta\dot{x} = A\Delta x + B\Delta u$$

$$\Delta y = C\Delta x + D\Delta u$$

$$\Delta y = E\Delta x + F\Delta u \quad (2)$$

Wherein, $$A = \begin{bmatrix} \frac{\partial f_1}{\partial x_1} & \cdots & \frac{\partial f_1}{\partial x_n} \\ \cdots & \cdots & \cdots \\ \frac{\partial f_n}{\partial x_1} & \cdots & \frac{\partial f_n}{\partial x_n} \end{bmatrix} B = \begin{bmatrix} \frac{\partial f_1}{\partial u_1} & \cdots & \frac{\partial f_1}{\partial u_n} \\ \cdots & \cdots & \cdots \\ \frac{\partial f_n}{\partial u_1} & \cdots & \frac{\partial f_n}{\partial u_n} \end{bmatrix} C = \begin{bmatrix} \frac{\partial g_1}{\partial x_1} & \cdots & \frac{\partial g_1}{\partial x_n} \\ \cdots & \cdots & \cdots \\ \frac{\partial g_n}{\partial x_1} & \cdots & \frac{\partial g_n}{\partial x_n} \end{bmatrix} \quad (3)$$

$$D = \begin{bmatrix} \frac{\partial g_1}{\partial u_1} & \cdots & \frac{\partial g_1}{\partial u_n} \\ \cdots & \cdots & \cdots \\ \frac{\partial g_n}{\partial u_1} & \cdots & \frac{\partial g_n}{\partial u_n} \end{bmatrix} E = \begin{bmatrix} \frac{\partial h_1}{\partial x_1} & \cdots & \frac{\partial h_1}{\partial x_n} \\ \cdots & \cdots & \cdots \\ \frac{\partial h_n}{\partial x_1} & \cdots & \frac{\partial h_n}{\partial x_n} \end{bmatrix} F = \begin{bmatrix} \frac{\partial h_1}{\partial u_1} & \cdots & \frac{\partial h_1}{\partial u_n} \\ \cdots & \cdots & \cdots \\ \frac{\partial h_n}{\partial u_1} & \cdots & \frac{\partial h_n}{\partial u_n} \end{bmatrix}$$

Joining with Equation (2), it can be concluded as:

$$\Delta\dot{x} = A'\Delta x \quad (4)$$

wherein, $$A' = A + B(F-D)^{-1}(C-E) \quad (5)$$

In Step 2, on the basis of the system matrix A' obtained from Step 1, finding out the mode $\lambda_i, i=1,2,\ldots,m$ that needs to be focused, wherein, "m" refers to the number of unstable or weak damping modes. Then finding out left modal matrix $\psi'$ and right modal matrix $\phi'$ of matrix A':

For left modal matrix $\psi'$:

$$\psi' = [\psi'_1{}^T \psi'_2{}^T \ldots \psi'_n{}^T]^T \quad (6)$$

wherein, $$\psi'_i A' = \lambda_i \psi'_i, i=1,2,\ldots,n \quad (7)$$

"n" is the number of state variables;

For right modal matrix $\phi'$:

$$\phi' = [\phi'_1 \phi'_2 \ldots \phi'_n] \quad (8)$$

wherein, $$A'\phi'_i = \lambda_i \phi'_i, i=1,2,\ldots,n \quad (9)$$

The sensitivity of eigenvalue $\lambda_i$ to the element of A' can be expressed as:

$$\frac{\partial \lambda_i}{\partial a'_{kj}} = \psi'_i \frac{\partial A'}{\partial a'_{kj}} \phi'_i = \psi'_{ik} \phi'_{ji} \quad (10)$$

The sensitivity of eigenvalue $\lambda_i$ to $a'_{kj}$ quantizes the change scope of $\lambda_i$ when $a'_{kj}$ changes, namely, when $a'_{kj}$ changes, $$\frac{\partial \lambda_i}{\partial a'_{kj}}$$

is larger, $\lambda_i$ changes more obviously. Thus, after obtaining eigenvalues of A', for the unstable mode, weak damping evanescent mode and weak damping ratio oscillation mode that may influence small disturbance stability of the system directly, the nonzero element that is most sensitive to this mode can be found according to the above method. However, it can be concluded from Equation (5) that A' is obtained through a series of operations like matrix multiplication and inversion, but specific expression is hard to get. Equation (5) can be adapted to:

$$A' = A + A_{other} \quad (11)$$

wherein, $$A_{other} = B(F-D)^{-1}(C-E) \quad (12)$$

From Equation (11), it can be visually seen that the state matrix A is a component of the system matrix A', so that the corresponding elements of A also exist in A'. Then after obtaining $$\frac{\partial \lambda_i}{\partial a'_{kj}},$$

$i=1,2,\ldots,m$ and finding out the highly sensitive set of the elements $\{a'_{kj}\}$ that are correspond to mode $\lambda_i, i=1,2,\ldots,m$, analyzing with the component $\{a_{kj}\}$ of the state matrix that shares the same code with the elements in $\{a'_{kj}\}$.

The reason for finding nonzero element is that: for a system with a fixed structure, the structure of its system matrix A' is also fixed. If $a_{kj}=0$, no matter how to change parameters, $a_{kj}$ remains unchanged.

In the Step 3, on the basis of finding out the set $\{a_{kj}\}$ of elements with high sensitivity in Step 2, finding out the adjustable controller parameters or system parameters in $\{a_{kj}\}$. Wherein, $k_i, i=1,2,\ldots,t$, "t" refers to the number of adjustable variables in $\{a_{kj}\}$. Setting $k_1$ as an example, letting $k_1$ change within the set interval [a,b], selecting several parameter nodes within this interval and then observing steady-state value of the variables required while calculating eigenvalues of A'. If the steady-state value basically remains unchanged, then selecting small step size $\Delta k_s$ and cycle calculating eigenvalues of A' while $k_i, i=1,2,\ldots,t$ is changing; if steady-state value changes obviously, then selecting large step size $\Delta k_i$, taking down each simulation steady-state value and calculating eigenvalue of A'.

After working out the eigenvalues of each group of A' while $k_1$ is changing, arranging these eigenvalues in a certain order (such as $\lambda_1, \lambda_2, \ldots, \lambda_n$) and drawing the chart on the track for changes of eigenvalues. For similar eigenvalues, please use different marks ("*", "Δ", "☆", "○") while drawing to avoid confusion. Then selecting optimal $\hat{k}_1$ from the chart on the track for changes. What needs to be noted is that $k_1$ might be related to certain several modes, so that it needs to balance changes of other dominant modes while selecting $\hat{k}_1$.

In Step 4, on the basis of selecting $\hat{k}_1$, repeating Step 3 for other adjustable parameters $k_i, i=2, \ldots, t$, until all the adjustable parameters are set.

In Step 5, comprehensively compare analysis results of the eigenvalues of optimal parameter set $\hat{k}_i, i=1,2, \ldots, t$ and original parameter set $k_i, i=1,2, \ldots, t$. Upon analysis, modal damping of the system can be greatly improved and small disturbance stability margin of the system can be intensified after optimizing parameters with sensitivity analysis.

The present invention is to improve the dominant modal damping generated by selecting improper controller parameters or system parameters after double-fed unit gets access to the system without adding other control means. Traditional methods for optimizing parameters are not highly targeted and for a large-scale system, traditional methods are of large workload, low efficiency and relatively blindness. For the method mentioned in the present invention, sensitivity analysis can be made on the non-ideal dominant mode $\lambda_i, i=1,2, \ldots, m$ happened to this system directly to find out the set of state matrix elements with highest sensitivity $\{a_{kj}\}$ of this mode, so as to find out the set of most relevant parameters $k_i, i=1,2, \ldots, t$. Then, it only needs to optimize the parameters in this set, which will greatly reduce workload. Parameter $k_i, i=1,2, \ldots, t$ can be analyzed through optimizing one by one, through which the track for the change of eigenvalue that corresponds to mode $\lambda_i, i=1,2, \ldots, m$ while each parameter is changing can be obtained visually. Finally, comprehensively analyzing change tracks of all the parameters can confirm a group of appropriate parameter set $\hat{k}_i, i=1,2, \ldots, t$. This group of parameters can be used to improve damping characteristic of this system obviously. This method has not increased cost, avoided BruteForee/exhaustive efforts on all adjustable parameters of the system and improved working efficiency, which is instructive for how to set system parameters from improving small disturbance stability.

SPECIFIC EMBODIMENTS OF THE PRESENT INVENTION

With reference to the drawings and embodiments, the present invention is illustrated in details below. It should be noted that the following illustrations are only examples, but not to limit the range and applications of the present invention.

The present invention adopts the model that is commonly used in researching characteristics of grid-connected operation of double-fed unit in PSCAD/EMTDC: DFIG_2010_11 (WIND FARM Vector Controlled Doubly-Fed Induction Generator) as a template to make the following improvements on this model:
1) adjusting reference frequency of the system from 60 Hz to 50 Hz;
2) removing "crowbar" circuit to make it suitable for small disturbance stability analysis after double-fed unit connects to the grid.

Figure 1:
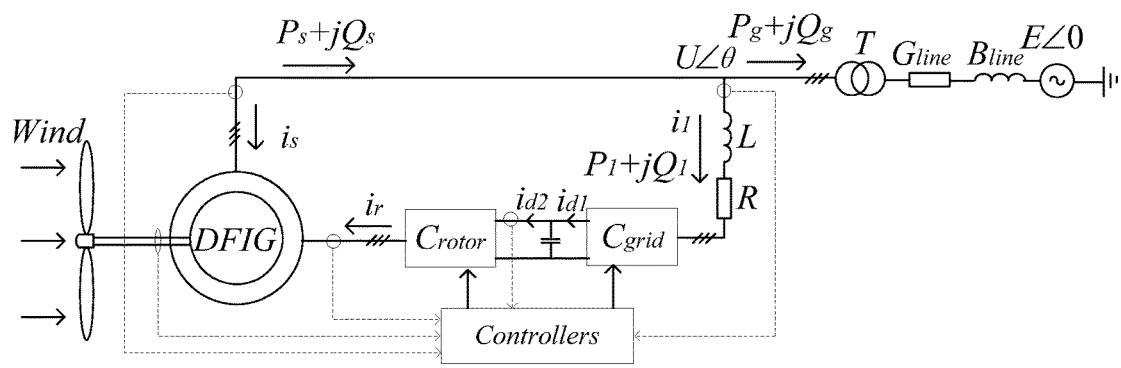
FIG. 1 is a system structure drawing for double-fed wind turbine-infinite system under the PSCAD/EMTDC of the present invention.

This model is double-fed wind turbine—infinite system. Correctness and practicability of the present invention will be verified with this model below. The system structure of this model shall refer to FIG. 1.

In Step 1, system matrix A' is formed in the following process:

First, building a state equation and an output equation of the double-fed unit. The system state equation is expressed as:

$$\dot{\omega}'_m = \frac{1}{T_j}\left(\frac{C_p A_{blade} \rho v^3}{2 S_B \omega'_m} - \frac{\gamma u_s L_m i_{qr}}{\alpha L_s S_B} - D\omega'_m\right) \quad (13)$$

$$\dot{\omega}'_{ref} = -\frac{1}{T_v}\omega'_{ref} + \frac{1}{\lambda_{eq} T_v}v$$

$$i_{qr} = \left(T_{i2} - \frac{DK_{p2}}{T_j}\right)\omega_m + \frac{K_{p2} k v^3}{T_j \omega_m} -$$

$$\left(T_{i2} - \frac{K_{p2}}{T_v}\right)\omega_{ref} - \frac{K_{p2}\gamma u_{s0} L_m}{\alpha T_j S_B L_s}i_{qr} - \frac{K_{p2}}{\lambda_{eq} T_v}v$$

$$i_{dr} = \frac{\alpha T_{i1} L_s}{\alpha L_s + K_{p1}\gamma u_s L_m}\left[Q_{ref} - \frac{\gamma u_s}{L_s}\left(\frac{i_{dr} L_m}{\alpha} - \frac{u_s}{\omega_s}\right)\right]$$

$$\dot{x}_1 = \frac{1}{T_x}(u_{dc} - x_1)$$

$$\dot{i}_{1dref} = \left(\frac{K_{pcvc}}{T_x} - T_{icvc}\right)x_1 - \frac{K_{pcvc}}{T_x}u_{dc} + T_{icvc}u_{dcref}$$

$$\dot{u}_{1dref} = K_{pssc}\left(\frac{K_{pcvc}}{T_x} - T_{icvc}\right)x_1 + T_{issc}i_{1dref} - \frac{K_{pssc}}{L}u_{1dref} +$$

$$\left(\frac{K_{pssc}R}{L} - T_{issc}\right)i_{1d} - \frac{K_{pssc}K_{pcvc}}{T_x}u_{dc} + K_{pssc}T_{icvc}u_{dcref}$$

$$\dot{i}_{1d} = \frac{1}{L}u_{1dref} - \frac{R}{L}i_{1d}$$

$$\dot{u}_{1qref} = \left(\frac{K_{pssc}R}{L} - T_{issc}\right)i_{1q} - \frac{K_{pssc}}{L}u_{1qref} + T_{issc}i_{1qref}$$

$$\dot{i}_{1q} = \frac{1}{L}u_{1qref} - \frac{R}{L}i_{1q}$$

$$\dot{u}_{dc} = \frac{\gamma u_s\left[i_{1d} - (1-\omega_m)\frac{K_m}{\alpha L_s}i_{qr}\right]}{C u_{dc}}$$

In Equation (13), $T_j$ is an inertia time constant of the generator; $\omega_s$ and $\omega'_m$ refer to synchronous speed and mechanical speed of the generator; $C_p$ is a rotor power coefficient; $A_{blade}$ is a blade area; $\rho$ is the air density; $v$ is wind speed; $S_B$ is benchmark capacity of the system; $\gamma$ is coordinate transformation coefficient; $\alpha$ is stator-rotor turns ratio; $u_s$ is phase voltage amplitude of generator stator; $L_s$ and $L_m$ refer to generator stator self-inductance, stator-rotor mutual inductance and generator rotator self-inductance; D is generator damping coefficient; $\omega'_{ref}$ is reference wind speed used to realize MPT; $\lambda_{eq}$ is equivalent tip speed ratio; $T_v$ and $T_x$ refer to time constants during inertia loop; $i_{dr}$ and $i_{qr}$ refer to the current of rotator at axis "d" and axis "q"; $i_{1d}$ and $i_{1q}$ refer to the current of grid-side converter at axis "d" and axis "q"; R and L refer to converter resistance and reactance; $K_{p1}$, $T_{i1}$, $K_{p2}$, $T_{i2}$, $K_{pcvc}$, $T_{icvc}$, $K_{pssc}$ and $T_{issc}$ are PI controller parameters; $u_{dcref}$, $u_{dc}$ and $x_1$ refer to reference value, actual value and measured value of DC voltage; $u_{1dref}$ and $u_{1qref}$ refer to inner ring PI output of grid-side controller; $i_{1dref}$ and $i_{1qref}$ refer to outer ring PI output of grid-side controller; C is a DC capacitor.

The output equation is expressed as:

$$P_g = 1.5 u_s \left( \frac{L_m i_{qr}}{\alpha L_s} - i_{1d} \right) \tag{14}$$

$$Q_g = -1.5 u_s \left( \frac{a u_s - \omega_s L_m i_{dr}}{\alpha \omega_s L_s} - i_{1q} \right)$$

The power flow equation of the system is expressed as:

$$P_g = U^2 G_{line} - UE(G_{line} \cos\theta + B_{line} \sin\theta)$$

$$Q_g = -U^2 B_{line} - UE(G_{line} \sin\theta - B_{line} \cos\theta) \tag{15}$$

In Equation (15), U and $\theta$ refer to an effective value and a phase angle of a high-side voltage of a transformer; E is an effective value of a line voltage of an infinite electric power bus; $G_{line}$ and $B_{line}$ refer to overall equivalent conductance and susceptance of the transformer and line.

Referring to the method in (2)-(3), linearizing and organizing Equations (13)-(15) at steady-state operation point, it can be concluded as:

$$A' = A + B(F-D)^{-1}(C-E) \tag{16}$$

wherein, state variable $\Delta x$, input variable $\Delta u$ and output variable $\Delta y$ can be expressed as:

$\Delta x = [\Delta\omega^*_m \Delta\omega^*_{ref} \Delta i_{dr} \Delta i_{qr} \Delta x_1 \Delta i_{1dref} \Delta u_{1dref} \Delta i_{1d} \Delta u_{1dref} \Delta i_{1q} \Delta u_{dc}]^T$ $\Delta u = [\Delta u_s \Delta\theta]^T$ $\Delta y = [\Delta P_g \Delta Q_g]^T \tag{17}$ The matrix that corresponds to Equation (16) is shown as:

$$A = \begin{array}{c} \\ \Delta\dot{\omega}^*_m \\ \Delta\dot{\omega}^*_{ref} \\ \Delta\dot{i}_{dr} \\ \Delta\dot{i}_{qr} \\ \Delta\dot{x}_1 \\ \Delta\dot{i}_{1dref} \\ \Delta\dot{u}_{1dref} \\ \Delta\dot{i}_{1d} \\ \Delta\dot{u}_{1dref} \\ \Delta\dot{i}_{1q} \\ \Delta\dot{u}_{dc} \end{array} \begin{bmatrix} \Delta\omega^*_m & \Delta\omega^*_{ref} & \Delta i_{dr} & \Delta i_{qr} & \Delta x_1 & \Delta i_{1dref} & \Delta u_{1dref} & \Delta i_{1d} & \Delta u_{1dref} & \Delta i_{1q} & \Delta u_{dc} \\ a_{0101} & 0 & 0 & a_{0104} & 0 & 0 & 0 & 0 & 0 & 0 & 0 \\ 0 & a_{0202} & 0 & 0 & 0 & 0 & 0 & 0 & 0 & 0 & 0 \\ 0 & 0 & a_{0303} & 0 & 0 & 0 & 0 & 0 & 0 & 0 & 0 \\ a_{0401} & a_{0402} & 0 & a_{0404} & 0 & 0 & 0 & 0 & 0 & 0 & 0 \\ 0 & 0 & 0 & 0 & a_{0505} & 0 & 0 & 0 & 0 & 0 & a_{0511} \\ 0 & 0 & 0 & 0 & a_{0605} & 0 & 0 & 0 & 0 & 0 & a_{0611} \\ 0 & 0 & 0 & 0 & a_{0705} & a_{0706} & a_{0707} & a_{0708} & 0 & 0 & a_{0711} \\ 0 & 0 & 0 & 0 & 0 & 0 & a_{0807} & a_{0808} & 0 & 0 & 0 \\ 0 & 0 & 0 & 0 & 0 & 0 & 0 & 0 & a_{0909} & a_{0910} & 0 \\ 0 & 0 & 0 & 0 & 0 & 0 & 0 & 0 & a_{1009} & a_{1010} & 0 \\ a_{1101} & 0 & 0 & a_{1104} & 0 & 0 & 0 & a_{1108} & 0 & 0 & a_{1111} \end{bmatrix}$$

The subscript "$_0$" represents steady-state value of relevant variable and superscript "*" represents per unit value. The corresponding matrix elements are shown as:

$$a_{0101} = -\frac{1}{T_j}\left(\frac{kv^3}{\omega^2_{m0}} + D\right),\ a_{0104} = -\frac{\gamma u_{s0} L_m}{\alpha T_j S_B L_s},\ a_{0202} = -\frac{1}{T_v},\ a_{0303} = -\frac{\gamma T_{i1} u_{s0} L_m}{\alpha L_s + K_{p1} \gamma u_{s0} L_m},$$

$$a_{0401} = T_{i2} - \frac{K_{p2} D}{T_j} - \frac{K_{p2} kv^3}{T_j \omega^2_{m0}},\ a_{0402} = \frac{K_{p2}}{T_v} - T_{i2},\ a_{0404} = -\frac{K_{p2} \gamma u_{s0} L_m}{\alpha T_j S_B L_s},\ a_{0505} = -\frac{1}{T_x},\ a_{0511} = \frac{1}{T_x},$$

$$a_{0605} = \frac{K_{pcvc}}{T_x} - T_{icvc},\ a_{0611} = -\frac{K_{pcvc}}{T_x},\ a_{0705} = K_{pssc}\left(\frac{K_{pcvc}}{T_x} - T_{icvc}\right),\ a_{0706} = T_{issc},\ a_{0707} = -\frac{K_{pssc}}{L},$$

$$a_{0708} = \frac{K_{pssc} R}{L} - T_{issc},\ a_{0711} = -\frac{K_{pssc} K_{pcvc}}{T_x},\ a_{0807} = \frac{1}{L},\ a_{0808} = -\frac{R}{L},\ a_{0909} = -\frac{K_{pssc}}{L},$$

$$a_{0910} = \frac{K_{pssc} R}{L} - T_{issc},\ a_{1009} = \frac{1}{L},\ a_{1010} = -\frac{R}{L},\ a_{1101} = \frac{\gamma u_{s0} L_m i_{qr0}}{\alpha C u_{dc0} L_s},\ a_{1104} = \frac{\gamma u_{s0} L_m (1-\omega_{m0})}{\alpha C u_{dc0} L_s},$$

$$a_{1108} = \frac{\gamma u_{s0}}{C u_{dc0}},\ a_{1111} = -\frac{\gamma u_{s0}\left[i_{1d0} - \frac{(1-\omega_{m0}) L_m i_{qr0}}{\alpha L_s}\right]}{C u^2_{dc0}}$$

-continued $$B = \begin{array}{c} \Delta\dot{\omega}_m^* \\ \Delta\dot{\omega}_{ref}^* \\ \Delta\dot{i}_{dr} \\ \Delta\dot{i}_{qr} \\ \Delta\dot{x}_1 \\ \Delta\dot{i}_{1dref} \\ \Delta\dot{u}_{1dref} \\ \Delta\dot{i}_{1d} \\ \Delta\dot{u}_{1dref} \\ \Delta\dot{i}_{1q} \\ \Delta\dot{u}_{dc} \end{array} \begin{bmatrix} \Delta u_s & \Delta\theta \\ b_{0101} & 0 \\ 0 & 0 \\ b_{0301} & 0 \\ b_{0401} & 0 \\ 0 & 0 \\ 0 & 0 \\ 0 & 0 \\ 0 & 0 \\ 0 & 0 \\ 0 & 0 \\ b_{1101} & 0 \end{bmatrix}$$

$$b_{0101} = -\frac{\gamma L_m i_{qr0}}{\alpha L_s S_B},\ b_{0401} = \frac{\gamma K_{p2} L_m i_{qr0}}{\alpha T_j L_s S_B},\ b_{1101} = \frac{\gamma\left[i_{1d0} - \frac{(1-\omega_{m0})L_m i_{qr0}}{\alpha L_s}\right]}{C u_{dc0}},$$

$$b_{0301} = \frac{L_s T_{i1} K_{p1} \gamma L_m \alpha}{(\alpha L_s + K_{p1}\gamma u_{s0} L_m)^2}\left[Q_{ref} - \frac{\gamma u_{s0}}{L_s}\left(\frac{i_{dr0}L_m}{\alpha} - \frac{u_{s0}}{\omega_s}\right)\right] + \frac{\alpha T_{i1}}{\alpha L_s + K_{p1}\gamma u_{s0}L_m}\left(\frac{2\gamma u_{s0}}{\omega_s} - \frac{\gamma i_{dr0}L_m}{\alpha}\right)$$

$$C = \begin{array}{c} \Delta P_g \\ \Delta Q_g \end{array} \begin{bmatrix} \Delta\omega_m' & \Delta\omega_{ref}' & \Delta i_{dr} & \Delta i_{qr} & \Delta x_1 & \Delta i_{1dref} & \Delta u_{1dref} & \Delta i_{1d} & \Delta u_{1dref} & \Delta i_{1q} & \Delta u_d \\ 0 & 0 & 0 & c_{0104} & 0 & 0 & 0 & c_{0108} & 0 & 0 & 0 \\ 0 & 0 & c_{0203} & 0 & 0 & 0 & 0 & 0 & 0 & c_{0210} & 0 \end{bmatrix}$$

$$c_{0104} = \frac{\gamma u_{s0} L_m}{\alpha L_s},\ c_{0108} = -\gamma u_{s0},\ c_{0203} = \frac{\gamma u_{s0} L_m}{\alpha L_m},\ c_{0210} = \gamma u_{s0}$$

$$D = \begin{array}{c} \Delta P_g \\ \Delta Q_g \end{array} \begin{bmatrix} \Delta u_s & \Delta\theta \\ d_{0101} & 0 \\ d_{0201} & 0 \end{bmatrix}$$

$$d_{0101} = \gamma\left(\frac{L_m i_{qr0}}{\alpha L_s} - i_{1d0}\right),\ d_{0201} = \gamma\left(i_{1q0} - \frac{2\alpha u_{s0} - \omega_s L_m i_{dr0}}{\alpha\omega_s L_s}\right)$$

$$E = 0_{2\times 11}$$

$$F = \begin{array}{c} \Delta P_g \\ \Delta Q_g \end{array} \begin{bmatrix} \Delta u_s & \Delta\theta \\ f_{0101} & f_{0102} \\ f_{0201} & f_{0202} \end{bmatrix}$$

$$f_{0101} = -m[E(G_{line}\cos\theta_0 + B_{line}\sin\theta_0) + 2mu_{s0}G_{line}]$$

$$f_{0102} = mu_{s0}E(G_{line}\sin\theta_0 - B_{line}\cos\theta_0)$$

$$f_{0201} = -m[E(G_{line}\sin\theta_0 - B_{line}\cos\theta_0) + 2mu_{s0}B_{line}]$$

$$f_{0202} = -mu_{s0}E(G_{line}\cos\theta_0 + B_{line}\sin\theta_0)$$

$$m = \frac{k_T U}{u_{s0}} = k_T\sqrt{\frac{3}{2}}$$

wherein, m is the ratio between effective value of high-side voltage of transformer and phase voltage amplitude of a generator stator. $k_T$ is the $k_T$ boosting transformer ratio.

A part of system parameters of this simulation model are shown in the following table.

TABLE 1

System Parameter Table

| Parameter | Value/unit | Parameter | Value/unit | Parameter | Value/unit |
|---|---|---|---|---|---|
| $R_s$ | 0.0054 p.u. | $R_r$ | 0.00607 p.u. | $L_{s\sigma}$ | 0.1 p.u. |
| $L_{r\sigma}$ | 0.11 p.u. | $L_m$ | 4.5 p.u. | $\omega_s$ | 314.15 rad/s |
| D | 0.0001 p.u. | $A_{blade}$ | 5026.55 m2 | P | 1.225 kg/m3 |
| $C_p$ | 0.28 | C | 0.0078 F | L | 1 mH |
| $K_{pssc}$ | 1 p.u. | $T_{issc}$ | 0.1 p.u. | $T_x$ | 0.04 µs |

Analysis results of eigenvalues of system matrix A' should refer to Table 2.

TABLE 2

Analysis Results of Eigenvalues of A'

| No. | Eigenvalue | Damping ratio | Oscillation frequency/Hz | Most relevant variable | Second relevant variable |
|---|---|---|---|---|---|
| $\lambda_1$ | −1214.3316 | 1 | 0 | $u_{1dref}$ | $i_{1d}$ |
| $\lambda_{2,3}$ | −4.8122 ± 130.8084i | 0.0368 | 20.8188 | $u_{dc}$ | $i_{1d}$ |
| $\lambda_4$ | −1199.9167 | 1 | 0 | $u_{1qref}$ | $i_{1q}$ |
| $\lambda_{5,6}$ | −0.7275 ± 1.0064i | 0.5858 | 0.1602 | $\omega^*_m$ | $i_{qr}$ |
| $\lambda_7$ | −0.0010 | 1 | 0 | $x_1$ | |
| $\lambda_8$ | −0.1000 | 1 | 0 | $i_{1dref}$ | |
| $\lambda_9$ | −0.0833 | 1 | 0 | $i_{1q}$ | $u_{1qref}$ |
| $\lambda_{10}$ | −20 | 1 | 0 | $\omega^*_{ref}$ | |
| $\lambda_{11}$ | −0.8193 | 1 | 0 | $i_{dr}$ | |

From the analysis results of Table 2, all the eigenvalues of the system matrix A' have negative real part, which represents the system is of small disturbance stability at this steady-state operation point. However, upon careful observation, it can figure out that the eigenvalues that correspond to evanescent modes $\lambda_7$, $\lambda_8$ and $\lambda_9$ are close to origin, so that unstability is easy to happen. Besides, damping of oscillation mode $\lambda_{2,3}$ is small, which is only 0.0368, so that it is weak damping mode. For the above modes, it can figure out that small disturbance stability margin of this system is relatively low and when steady-state operating point shifts, unstability might happen.

After finding out the mode needs to be focused, taking Step 2 to solve sensitivities of the modes $\lambda_{2,3}$, and $\lambda_7$, $\lambda_8$ and $\lambda_9$ to the nonzero elements in A'. For the expression of elements, the state matrix A can be used instead. Detailed results should refer to Table 3.

TABLE 3

Sensitivity of Weak Damping Mode to the Elements in A'

| Mode | Element | Corresponding expression in A | Sensitivity | Abandon or not |
|---|---|---|---|---|
| $\lambda_{2,3}$ | $a_{0706}'$ | $T_{issc}$ | 0.4950 − 0.0716i | No |
| | $a_{0708}'$ | $\frac{K_{pssc}R}{L} - T_{issc}$ | 0.4028 − 0.1041i | No |
| | $a_{1106}'$ | 0 | −0.0013 + 0.9443i | Yes |

TABLE 3-continued

Sensitivity of Weak Damping Mode to the Elements in A'

| Mode | Element | Corresponding expression in A | Sensitivity | Abandon or not |
|---|---|---|---|---|
| $\lambda_7$ | $a_{0505}'$ | $-\frac{1}{T_x}$ | 1.0011 | No |
| | $a_{0511}'$ | $\frac{1}{T_x}$ | 1.0011 | No |
| $\lambda_8$ | $a_{0606}'$ | 0 | 1.0013 | Yes |
| | $a_{0706}'$ | $T_{issc}$ | −1.0015 | No |
| | $a_{0806}'$ | 0 | −1.0014 | Yes |
| $\lambda_9$ | $a_{0909}'$ | $-\frac{K_{pssc}}{L}$ | 0.8334 | No |
| | $a_{0910}'$ | $\frac{K_{pssc}R}{L} - T_{issc}$ | −0.8334 | No |

It can be concluded from Table 3 that $T_{issc}$, $K_{pssc}$, $T_x$, L and R are relatively more sensitive to the weak damping mode happened to this system. Conditions about the changes of different system modes are researched below when the above parameters change (the initial parameter values should refer to Table 1):

1) Conditions about the Changes of System Eigenvalues when $T_{issc}$ Changes

Taking the change interval of $T_{issc}$ as [0, 10], selecting parameter nodes as $T_{issc}$=0.1, 1, 5, 10 and observing simulation steady-state solution. It is concluded from the results that when $T_{issc}$ changes, simulation steady-state solution is basically unchanged. Take $\Delta T_{issc}$=1, change track of system eigenvalues should refer to FIGS. 2a and 2b.

Figure 2:
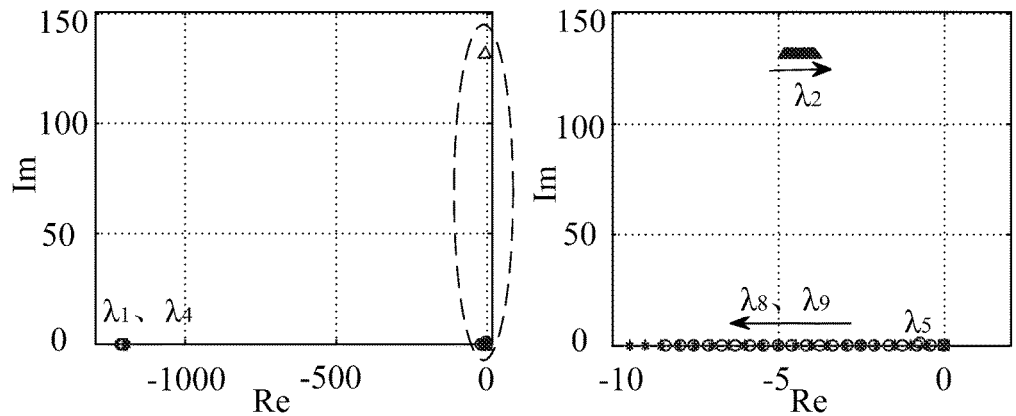
FIGS. 2a and 2b are the tendency charts for eigenvalues of the system mode while $T_{issc}$ is changing of the present invention.

It can be concluded from FIGS. 2a and 2b that when $T_{issc}$=0, the system will have a zero eigenvalue. With $T_{issc}$ increases, damping ratio $\lambda_{2,3}$ of oscillation mode will decrease slightly and damping of evanescent modes $\lambda_8$ and $\lambda_9$ will increase obviously. As when $T_{issc}$ increases, damping ratio of oscillation mode $\lambda_{2,3}$ decreases little, but damping of evanescent modes $\lambda_8$ and $\lambda_9$ increases obviously, so that $T_{issc}$ can be increased properly to improve small disturbance stability of the system, taking $\hat{T}_{issc}$=10.

2) Conditions about the Changes of System Eigenvalues when $K_{pssc}$ Changes

Replacing original $T_{issc}$ with $\hat{T}_{issc}$=10 obtained from 1), setting the change interval of $K_{pssc}$ as [0, 10], selecting parameter nodes as $K_{pssc}$=0.1, 1, 5, 10 and observing simulation steady-state solution. It is concluded from the results that when $K_{pssc}$ changes, simulation steady-state solution is basically unchanged. Setting $\Delta K_{pssc}$=1, the changing track of the system eigenvalues should refer to FIGS. 3a and 3b.

Figure 3:
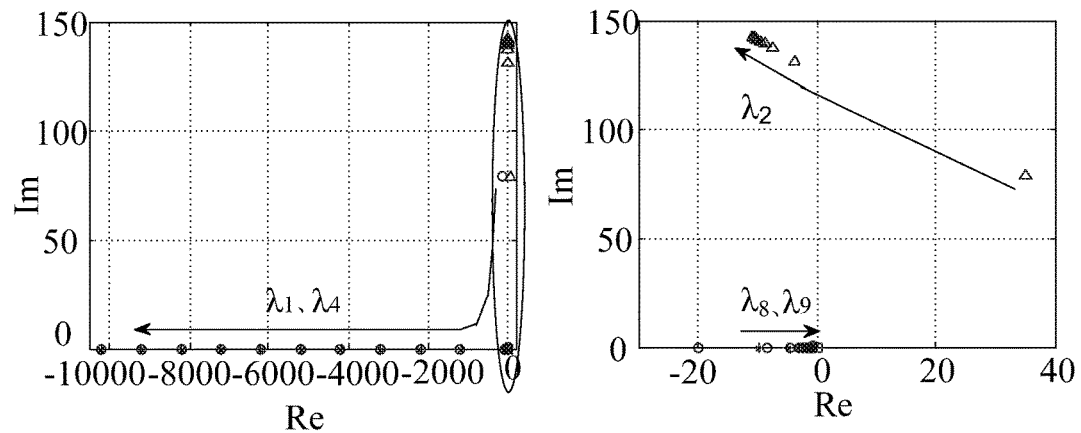
FIGS. 3a and 3b are the tendency charts for eigenvalues of the system mode while $K_{pssc}$ is changing of the present invention.

It can be concluded from FIGS. 3a and 3b that when $K_{pssc}$=0, positive real part happens to oscillation mode $\lambda_{2,3}$($\lambda_{2,3}$=35.0110±16.4581i), the steady-state of the system becomes unstable and evanescent modes $\lambda_1$ and $\lambda_4$ become a group of oscillation modes. With $K_{pssc}$ increases, damping of oscillation mode $\lambda_{2,3}$ will increase, but the eigenvalues that correspond to weak evanescent modes $\lambda_8$ and $\lambda_9$ move from negative real axis to origin point and its degree of stability decreases. Thus, if $K_{pssc}$ is too big or too small, the degree of stability of the system will be decreased. It can be figured out from FIGS. 3a and 3b that when $K_{pssc}$>3, damping of mode $\lambda_{2,3}$ will increase slowly, but $\lambda_8$ and $\lambda_9$ still move to the origin point, so that take $\hat{K}_{pssc}$=2.

3) Conditions about the Changes of System Eigenvalues when $T_x$ Changes

It can be concluded from Table 3 that $T_x$ is only highly sensitive to $\lambda_7$. $T_x$ is an inertia time constant while measuring DC voltage, the value of which is small. Setting the change interval as [0.01,0.1], it can be concluded from the results that when $T_x$ changes, the simulation stability solution is basically unchanged. When $\Delta T_x$=0.01, from simulation results, it figures out that the system eigenvalue that changes $T_x$ is also basically unchanged, which indicates that weak damping of mode $\lambda_7$ is unrelated to system parameters and it is caused by system structure. Thus, if value of $T_x$ does not change, keeping $T_x$=0.04.

4) Conditions about the Changes of System Eigenvalues when L Changes

L is the equivalent conversion inductance of a grid-side converter, setting change interval of L as [0.5,2] mH, selecting parameter nodes as L=0.5,1,1.5,2 and observing simulation steady-state solution. It is concluded from the results that when $K_{pssc}$ changes, simulation steady-state solution is basically unchanged. Setting $\Delta L$=0.1 mH, the change track of system eigenvalues should refer to FIGS. 4a and 4b.

Figure 4:
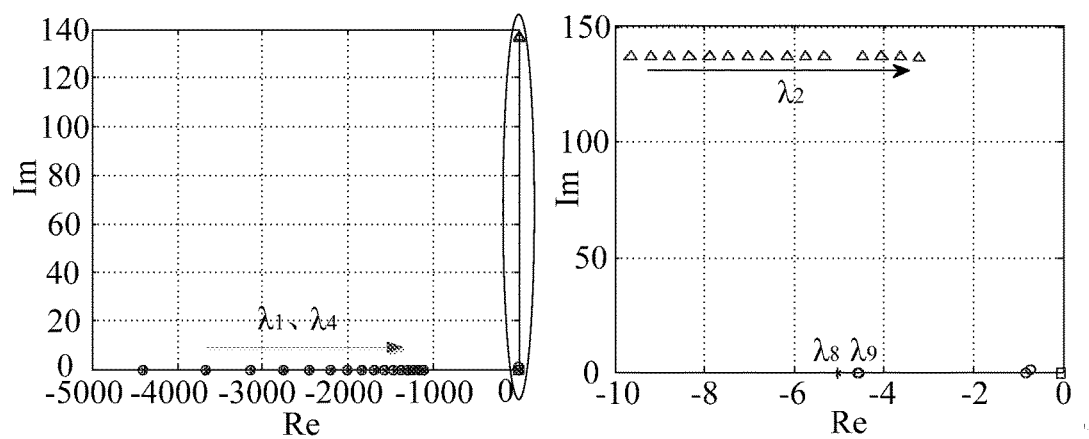
FIGS. 4a and 4b are the tendency chart for eigenvalues of the system mode while L is changing of the present invention.
Figure 5:
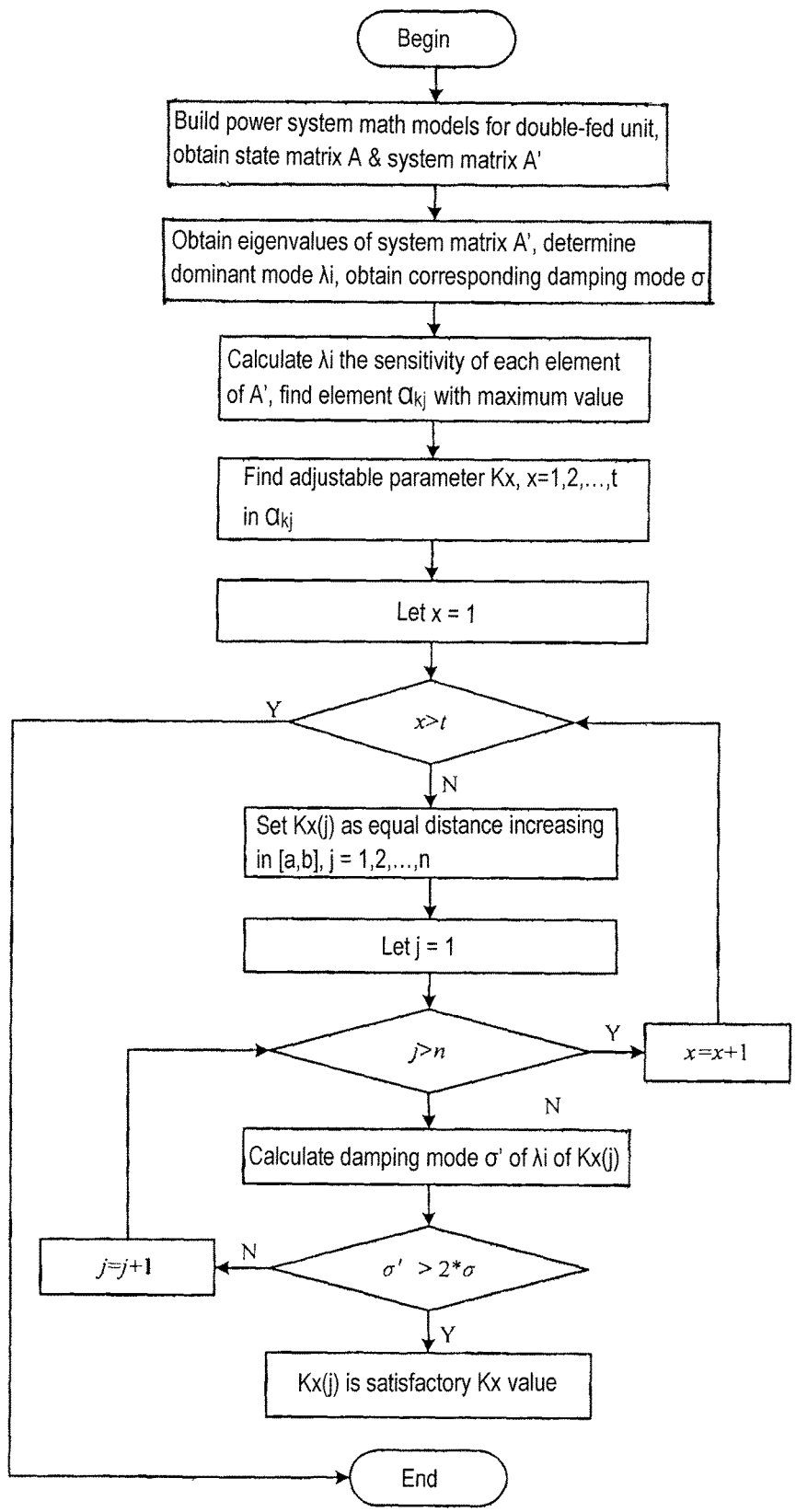
FIG. 5 is a flow chart of the method to improve disturbance stability after double-fed unit gets access to a system according to the present invention.

It can be concluded from FIGS. 4a and 4b that with L increases, damping of oscillation mode $\lambda_{2,3}$ will decrease obviously and damping ratio also reduces; eigenvalue that corresponds to evanescent mode $\lambda_9$ tends to move away from an imaginary axis, but it is not obvious and can be ignored; strong evanescent modes $\lambda_1$ and $\lambda_4$ move towards the origin rapidly and damping decreases, but it still does not belong to strong damping and influence little on system stability. Therefore, if it is allowed, L is smaller, the stability margin of the system is higher. Take $\hat{L}$=0.5 mH here.

5) Conditions about the Changes of System Eigenvalues when R Changes

R is the AC side equivalent resistance of a grid-side converter. Upon analysis, it indicates that when R>0.5Ω, oscillation will happen to the system; when R<0.5Ω, value of R has very little influence on system eigenvalues. On the basis of the above conclusions, take $\hat{R}$=0.2Ω.

Until now, optimization for the parameters that correspond to the four concerned modes is completed. Table 4 is about the comparison between key mode eigenvalues of initial parameters and optimal parameters of the system. It can be concluded through analyzing the above contents, $T_x$ and R influence little on eigenvalues. Thus, in Table 4, initial parameters and optimal parameters are set as $T_x$=0.04 and R=0.2Ω.

TABLE 4

Comparison between Key Mode Eigenvalues of Initial Parameters and Optimal Parameters

| | Parameter | |
|---|---|---|
| Mode | Initial parameter $T_{issc}$ = 0.1 $\hat{K}_{pssc}$ = 1 $\hat{L}$ = 1 mH | Optimal parameter $\hat{T}_{issc}$ = 10 $\hat{K}_{pssc}$ = 2 $\hat{L}$ = 0.5 mH |
| $\lambda_{2,3}$ | −4.8122 ± 130.8084i | −9.6379 ± 137.1746i |
| $\lambda_7$ | −0.0010 | −0.0010 |
| $\lambda_8$ | −0.1000 | −5.0028 |
| $\lambda_9$ | −0.0833 | −4.5502 |

It can be concluded from Table 4 that except mode $\lambda_7$, damping of other dominant modes has been raised for a certain extent. For $\lambda_7$, its weak damping is not caused for selecting improper parameters, so that it needs to be improved through changing system control structure or adding other control devices; for oscillation $\lambda_{2,3}$, its damping has been raised from 0.0368 to 0.0701; $\lambda_8$ and $\lambda_9$ have changed from weak damping mode to strong damping mode and small disturbance stability margin of the system has been improved obviously.

What is said above has totally verified that while researching the weak damping mode generated after double-fed unit gets access to power grid, system damping can be effectively improved without adding other control means through optimizing system parameters with sensitivity analysis. Compared with traditional optimization methods. The present invention will greatly decrease unnecessary calculated amount and improve efficiency.

This test system is only a preferred embodiment of the present invention, but protection scope of the present invention is not confined to the embodiment. Any changes or replacements that the person of ordinary skill in the art can figure out easily within the technical range disclosed by the present invention should be included in the protection scope of the present invention.

The invention claimed is:

1. A computer implemented method for improving small disturbance stability after a double-fed power generation unit gets access to a power transmission system characterized in that the method comprises the following steps executed on a processor:

step 1: building complete mathematical models for the double-fed power generation unit, the mathematical models mainly include an aerodynamic model, a power generator model, a mechanical model and a control system model; listing a system state equation and an output equation and then building a small disturbance mathematical model $\Delta\dot{x}$=A'$\Delta$x by integrating power flow equation of the system after double-fed power generation unit gets access to the system;

step 2: calculating a left modal matrix $\psi$ and a right modal matrix $\phi$ of a matrix A', determining the sensitivity of unstable modes or weak damping modes to matrix A' with the formula $$\frac{\partial \lambda_i}{\partial a_{kj}} = \psi_{ik}\phi_{ji}$$

and finding out one to two nonzero elements a'$_{ij}$ with the highest sensitivity in the matrix; analysis indicating that at a low and middle frequency band concerned by small disturbance stability of the system, the difference between eigenvalue of the matrix A' and that of the state matrix A is not very large and as expression of A' is very complex, element $a_{ij}$ in A is used to make sensitivity analysis instead of the element a'$_{ij}$ in A';

step 3: for controller or system parameters that can be set in $a_{ij}$, changing value of these parameters within a certain interval, observing steady-state value of the variable required while calculating eigenvalue of matrix A' in simulation results, then putting the steady-state value in A' to solve the eigenvalues that correspond to each group of parameters and drawing a chart on the change track of eigenvalues; if eigenvalues are disperse, a part of the overlapped eigenvalues need to be locally enlarged to observe the trend for eigenvalues of dominant modes of the system;

step 4: if there are other parameters that can be set in $a_{ij}$, then repeating Step 3;

step 5: comprehensively analyzing the chart on modal eigenvalues change with the track of parameters in Step 4, adjusting the parameters in Step 4, then selecting appropriate parameter combination upon comparison, with which both dominant modal damping and small disturbance stability margin of the system can be obviously improved.

2. The computer implemented method for improving small disturbance stability after double-fed power generation unit gets access to the power transmission system according to claim 1 characterized in that the system matrix A' is built in the following methods:
  selecting an appropriate state variable, an input variable and an output variable, state equation, output equation and power flow equation of the system can be expressed in the following general forms:

$$\dot{x}=f(x,u)$$

$$y=g(x,u) \qquad (1),$$

$$y=h(x,u)$$

wherein x is a state variable matrix, u is an input variable matrix, y is an output matrix;
wherein linearizing an equation (1) at a steady-state operating point, it can be concluded as:

$$\Delta\dot{x}=A\Delta x+B\Delta u$$

$$\Delta y=C\Delta x+D\Delta u \qquad (2),$$

$$\Delta y=E\Delta x+F\Delta u$$

wherein, $$A=\begin{bmatrix}\frac{\partial f_1}{\partial x_1} & \cdots & \frac{\partial f_1}{\partial x_n}\\ \cdots & \cdots & \cdots\\ \frac{\partial f_n}{\partial x_1} & \cdots & \frac{\partial f_n}{\partial x_n}\end{bmatrix} B=\begin{bmatrix}\frac{\partial f_1}{\partial u_1} & \cdots & \frac{\partial f_1}{\partial u_n}\\ \cdots & \cdots & \cdots\\ \frac{\partial f_n}{\partial u_1} & \cdots & \frac{\partial f_n}{\partial u_n}\end{bmatrix} C=\begin{bmatrix}\frac{\partial g_1}{\partial x_1} & \cdots & \frac{\partial g_1}{\partial x_n}\\ \cdots & \cdots & \cdots\\ \frac{\partial g_n}{\partial x_1} & \cdots & \frac{\partial g_n}{\partial x_n}\end{bmatrix} \quad (20)$$

$$D=\begin{bmatrix}\frac{\partial g_1}{\partial u_1} & \cdots & \frac{\partial g_1}{\partial u_n}\\ \cdots & \cdots & \cdots\\ \frac{\partial g_n}{\partial u_1} & \cdots & \frac{\partial g_n}{\partial u_n}\end{bmatrix} E=\begin{bmatrix}\frac{\partial h_1}{\partial x_1} & \cdots & \frac{\partial h_1}{\partial x_n}\\ \cdots & \cdots & \cdots\\ \frac{\partial h_n}{\partial x_1} & \cdots & \frac{\partial h_n}{\partial x_n}\end{bmatrix} F=\begin{bmatrix}\frac{\partial h_1}{\partial u_1} & \cdots & \frac{\partial h_1}{\partial u_n}\\ \cdots & \cdots & \cdots\\ \frac{\partial h_n}{\partial u_1} & \cdots & \frac{\partial h_n}{\partial u_n}\end{bmatrix}$$

joining with the Equation (2), it can be concluded as:

$$\Delta\dot{x}=A'\Delta x \qquad (4)$$

wherein, $$A'=A+B(F-D)^{-1}(C-E) \qquad (5).$$

3. The computer implemented method for improving small disturbance stability after double-fed power generation unit gets access to the power transmission system comprising claim 1 characterized in that, in the Step 2, on the basis of the system matrix A' obtained from Step 1, finding out the mode $\lambda_i$, i=1,2, . . . ,m that needs to be focused, wherein "m" refers to the number of unstable or weak damping modes; then finding out left modal matrix $\psi'$ and right modal matrix $\phi'$ of matrix A':
for the left modal matrix $\psi'$:

$$\psi'=[\psi'_1{}^T\psi'_2{}^T \ldots \psi'_n{}^T]^T \qquad (6),$$

wherein, $$\psi'_i A'=\lambda_i \psi'_i, i=1,2,\ldots,n \qquad (7)$$

"n" is the number of state variables;
for right modal matrix $\phi'$:

$$\phi'=[\phi'_1\phi'_2 \ldots \phi'_n] \qquad (8)$$

wherein, $$A'\phi'_i=\lambda_i\phi'_i, i=1,2,\ldots,n \qquad (9)$$

sensitivity of eigenvalue $\lambda_i$ to the element of A' can be expressed as:

$$\frac{\partial \lambda_i}{\partial a'_{kj}}=\psi'_i\frac{\partial A'}{\partial a'_{kj}}\phi'_i=\psi'_{ik}\phi'_{ji} \qquad (10)$$

the sensitivity of eigenvalue $\lambda_i$ to $a'_{kj}$ quantizes the change scope of $\lambda_i$ when $a'_{kj}$ changes, namely, when $a'_{kj}$ changes, $$\frac{\partial \lambda_i}{\partial a'_{kj}}$$

is larger, $\lambda_i$ changes more obviously; thus after getting eigenvalues of A', for the unstable mode, weak damping evanescent mode and weak damping ratio oscillation mode that may influence small disturbance stability of the system directly, the nonzero element that is most sensitive to this mode can be found according to the above method; adapting an Equation (5) into:

$$A'=A+A_{other} \qquad (11)$$

wherein, $$A_{other}=B(F-D)^{-1}(C-E) \qquad (12)$$

from Equation (11), it can be visually seen that state matrix A is a component of system matrix A', so that corresponding elements of A also exist in A'; then after obtaining $$\frac{\partial \lambda_i}{\partial a'_{kj}},$$

i=1,2, . . . ,m and finding out set of the elements that are highly sensitive to mode $\lambda_i$, i=1,2, . . . ,m, analyzing with the component $\{a_{kj}\}$ of state matrix that shares the same code with the elements in $\{a'_{kj}\}$;
the reason for finding nonzero element is that: for a system with fixed structure, structure of its system matrix A' is also fixed; if $a_{kj}$=0, no matter how to change parameters, $a_{kj}$ remains unchanged.

4. The computer implemented method for improving small disturbance stability after double-fed power generation unit gets access to the power transmission system according to claim 1 characterized in that, in the Step 3, on the basis of finding out the set $\{a_{kj}\}$ of elements with high sensitivity in Step 2, finding out the adjustable controller parameters or system parameters in $\{a_{kj}\}$, wherein, $k_i$, i=1,2, . . . ,t, "t" refers to the number of adjustable variables in $\{a_{kj}\}$.

5. The computer implemented method for improving small disturbance stability after double-fed power generation unit gets access to the power transmission system according to claim 4 characterized in that, the $k_1$ refers that: letting $k_1$ change within set interval [a,b] and selecting several parameter nodes within this interval, then cycling calculate eigenvalues of A' while $k_1$ is changing and selecting the optimal one $\hat{k}_1$.

6. The computer implemented method for improving small disturbance stability after double-fed power generation unit gets access to the power transmission system according to claim 1 characterized in that, in the Step 4, on the basis of selecting $\hat{k}_1$, repeating Step 3 for other adjustable parameters $k_i$, i=2, . . . ,t, until all the adjustable parameters are set.

7. The computer implemented method for improving small disturbance stability after double-fed power generation unit gets access to the power transmission system according to claim 1 characterized in that, in the Step 5, comprehensively comparing analysis results of the eigenvalues of optimal parameter set $\hat{k}_i, i=1,2,\ldots,t$ and original parameter set $k_i, i=1,2,\ldots,t$; upon analysis, modal damping of the system can be greatly improved and small disturbance stability margin of the system can be intensified after optimizing parameters with sensitivity analysis.

* * * * *